Figure 2:
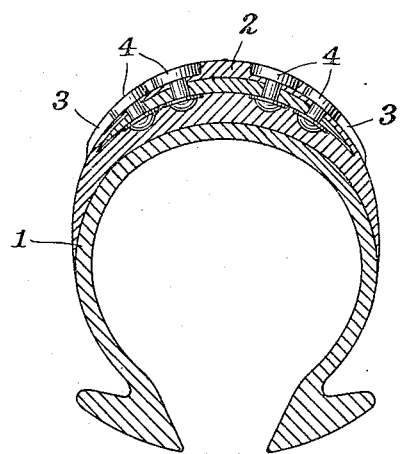

B. W. WITTENBERG.
PNEUMATIC TIRE.
APPLICATION FILED SEPT. 11, 1912.

1,069,365.

Patented Aug. 5, 1913.

Witnesses:
John Murtagh
M. A. Dillon

Inventor:
Benjamin Wladimirowitsch
Wittenberg
by Goepel & Goepel
Attorneys.

UNITED STATES PATENT OFFICE.

BENJAMIN WLADIMIROWITSCH WITTENBERG, OF RIGA, RUSSIA.

PNEUMATIC TIRE.

1,069,365. Specification of Letters Patent. Patented Aug. 5, 1913.

Application filed September 11, 1912. Serial No. 719,820.

*To all whom it may concern:*

Be it known that I, BENJAMIN WLADIMIROWITSCH WITTENBERG, a subject of the Czar of Russia, and resident of 31 Weidendamm, Riga, in the Empire of Russia, have invented certain new and useful Improvements in Pneumatic Tires, of which the following is a specification.

This invention relates to pneumatic tires and particularly to non-skidding devices for the pneumatic tires of motor vehicles.

In the development of non-skidding devices for motor vehicles those provided with rivets secured in the tread cover have proved to be relatively the best, but the defects which made themselves felt from the beginning and which in particular consist in the rivets becoming loosened from the cover frequently even after quite a short period of use, and in becoming lost have not been successfully remedied in spite of numerous improvements.

It is the object of the present invention to do away with these defects in a new way, namely, by the said anti-skidding rivets being applied not as hitherto customary to a pneumatic tire with a smooth tread, but to a pneumatic tire having a tread provided with transverse ribs, this being effected in such a manner that the anti-skidding rivets are situated in the grooves between the ribs. In the case of such rubber tires provided with transverse ribs the ribs themselves generally consist of pure rubber material and are consequently during use comparatively speaking very flexible, the result being that under the influence of the load the ribs are forced apart. If, as in accordance with the present invention the anti-skidding rivets are arranged in the grooves between the ribs, the rubber material of the ribs flattened out under the influence of the load causes a lateral pressure to be applied against the projecting anti-skidding rivets with the result that even this rubber material opposes the loosening of the anti-skidding rivets from their places of attachment and this action is the greater the more the tire is strained or the greater the load acting on the tires. Practical experiments have proved that in this manner the tearing out of the anti-skidding rivets can be completely avoided. In the case of the present invention it is immaterial in principle whether the ribs of the rubber tire are exactly at right angles to the tread or are at an angle to the latter but the ribs should not run parallel to the longitudinal axis of the tire, since in this latter case the action aimed at in this invention cannot be obtained.

A tire according to the present invention is illustrated by way of example in the accompanying drawing, in which—

Figure 1:
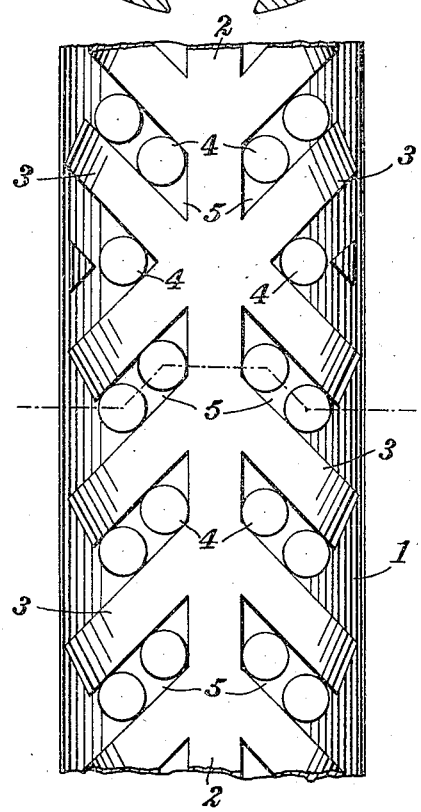

Figure 1 is a plan of a portion of a so-called Columb tire, and Fig. 2 a transverse section through the same.

In the case of the construction represented in the drawing, 1 is the rubber tire which, as in the case of the so-called Columb tires is provided in the middle of the tread with a longitudinal rib 2, from which transverse ribs 3 branch at an angle of about 45° to the longitudinal rib and which are directed toward different sides, as for example is the case with the feathers of an arrow. Now according to the present invention, the anti-skidding rivets 4 are inserted in the grooves 5 between the ribs 3 the number of said rivets depending on the size of the tire or on the width of the tread. The construction of the anti-skidding rivets themselves as well as their mode of attachment to the rubber tires are of no consideration as far as the present invention is concerned and they may therefore be as desired. However, by said anti-skidding rivets 5 being arranged in the grooves between the ribs on the tread the effect is obtained that since said projecting ribs become flattened out under the influence of the load on the vehicle the flattened material of these ribs lies laterally against the anti-skidding rivets and thus, in addition to the attachment members which otherwise serve to hold the rivets, form reliable means which have the tendency to oppose the loosening of the anti-skidding rivets, this tendency being the greater the greater the straining of the tire, or in other words, the greater the load acting on the tires.

As already mentioned the construction of the tire *per se* and also the formation of the ribs on the tread may vary without the essence of the invention being affected. It is essential merely for said ribs to run transversely or substantially transversely to the tread. It has also been found by practical experiment to be suitable to mount the anti-skidding rivets in such a manner or to make them of such a size that their outer surface lies in the same plane as the surface of the ribs of the rubber tire. Through these ribs being widened out more or less on the tread of the tire in consequence of the load acting on them, the ribs being compressed at the same time, the anti-skidding rivets come into contact with the ground in the proper manner in order to prevent skidding as desired, but it is possible to allow the anti-skidding rivets to project in the normal manner relatively to the surface of the ribs on the rubber tire.

I claim:—

1. The combination, with a tire provided with transverse ribs projecting from the tread thereof, of non-skid rivets secured between said ribs, the latter being in direct contact with the said rivets.

2. The combination, with a tire provided with transverse ribs projecting from the tread thereof, of non-skid rivets secured between the said ribs, the outer faces of the rivets being normally approximately level with the faces of the ribs, the latter being in direct contact with the said rivets.

In testimony, that I claim the foregoing as my invention, I have signed my name in presence of two subscribing witnesses.

BENJAMIN WLADIMIROWITSCH WITTENBERG.

Witnesses:
H. H. KIŐPOT,
A. LINONN.

Copies of this patent may be obtained for five cents each, by addressing the "Commissioner of Patents, Washington, D. C."